United States Patent
Aarnio

(10) Patent No.: US 7,565,584 B2
(45) Date of Patent: Jul. 21, 2009

(54) SETTING TRANSMISSION LENGTH BASED ON ESTIMATED ERROR RATE

(75) Inventor: Steven J. Aarnio, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 418 days.

(21) Appl. No.: 11/442,063

(22) Filed: May 26, 2006

(65) Prior Publication Data

US 2007/0288829 A1    Dec. 13, 2007

(51) Int. Cl.
*G06F 11/00* (2006.01)

(52) U.S. Cl. ................................................. 714/708
(58) Field of Classification Search ................ 714/704, 714/708
See application file for complete search history.

(56) References Cited

U.S. PATENT DOCUMENTS

| | | | |
|---|---|---|---|
| 5,663,958 A | 9/1997 | Ward | |
| 6,055,242 A * | 4/2000 | Doshi et al. | 370/458 |
| 6,285,681 B1 * | 9/2001 | Kolze et al. | 370/442 |
| 7,096,274 B1 * | 8/2006 | Ci et al. | 709/236 |
| 7,333,556 B2 * | 2/2008 | Maltsev et al. | 375/295 |
| 7,398,436 B2 * | 7/2008 | Starr | 714/701 |
| 2002/0141479 A1 * | 10/2002 | Garcia-Luna-Aceves et al. | 375/132 |
| 2002/0159553 A1 | 10/2002 | McCarty, Jr. et al. | |
| 2003/0152095 A1 | 8/2003 | Foore et al. | |
| 2005/0005227 A1 * | 1/2005 | Felbecker et al. | 714/776 |
| 2005/0111485 A1 * | 5/2005 | Bruckmann et al. | 370/465 |

FOREIGN PATENT DOCUMENTS

| | | |
|---|---|---|
| KR | 1020030058171 | 7/2003 |
| WO | 2007/140346 A3 | 12/2007 |

OTHER PUBLICATIONS

U.S. Appl. No. 11/373,422, filed Mar. 10, 2006—Method and Apparatus for Providign A Header Resynchronization System for a Broadband Wireless Access Network.
International Preliminary Report on Patentability for PCT Patent Application No. PCT/US2007/069818, Mailed Dec. 11, 2008, pp. 6.
International Search Report/Written Opinion for PCT Patent Application No. PCT/US2007/069818, Mailed Nov. 13, 2007, pp. 10.

* cited by examiner

*Primary Examiner*—James C Kerveros
(74) *Attorney, Agent, or Firm*—John F. Travis

(57) ABSTRACT

Based on an expected error rate for a wireless transmission, the length of the transmission may be limited so that the probability of an error in one or more particular data segments is no greater than a predetermined threshold value. The expected error rate and/or the threshold value may be periodically changed, based on various criteria.

21 Claims, 4 Drawing Sheets

SETTING TRANSMISSION LENGTH BASED ON ESTIMATED ERROR RATE

BACKGROUND

Because wireless signals may be susceptible to interference from other wireless signals, may rapidly decline in strength with increased distance, and may be degraded by objects in the signal path that diminish or reflect the signals, errors in wireless communications are common. Various techniques have been developed to detect and correct wireless communications errors. Some techniques allow certain types of errors to be corrected at the receiver. However, many types of errors require that the data be retransmitted at a later time, thus extending the time it takes to successfully complete the communication. This delay in completion time may be detrimental if the communication is time-critical, i.e., if the data needs to be correctly received within a certain time period to avoid harmful consequences.

In some types of wireless communications protocols, multiple segments of data may be contained within a continuous transmission, and each of those segments may have a variable length that is specified by a field within the segment. For example, in the protocols defined in IEEE standard 802.16, multiple Protocol Data Units (PDUs) may be transmitted sequentially in a single burst transmission, with each PDU containing a length field that defines its length, so that a receiving device will know where in the transmission that the current PDU ends and the next PDU begins. Thus, if an error occurs in one PDU so that the end of that PDU cannot be reliably identified (e.g., if the Length field is corrupted), that PDU and all remaining PDUs in the transmission may have to be retransmitted. This may greatly increase the potential harm caused by the error, especially in time-critical communications.

BRIEF THE DRAWINGS

Some embodiments of the invention may be understood by referring to the following description and accompanying drawings that are used to illustrate embodiments of the invention. In the drawings.

DETAILED DESCRIPTION

Figure 1:
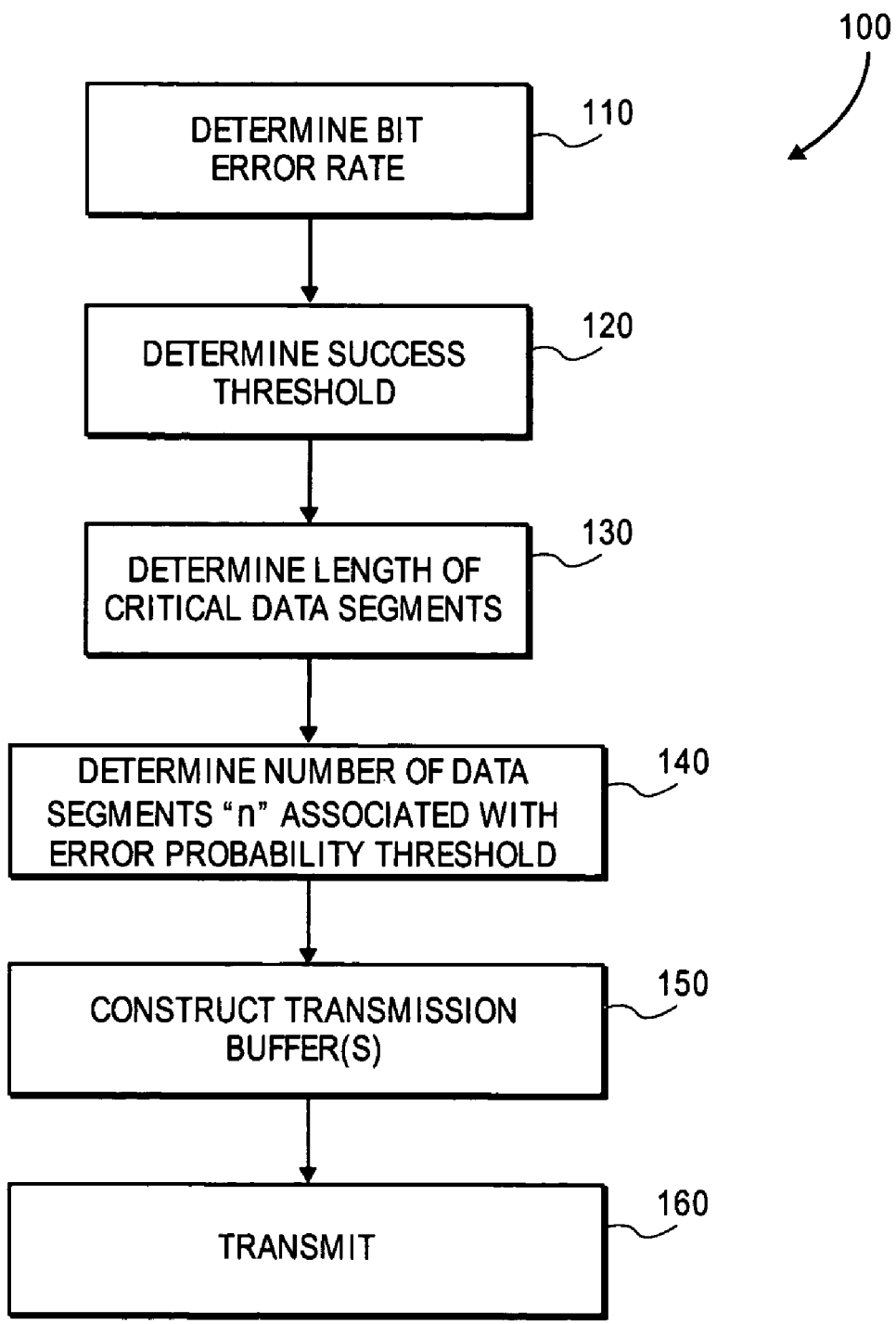
FIG. 1 shows a flow diagram of a method, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "wireless" may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The term "mobile wireless device" may be used to describe a wireless device that may be moved while it is communicating.

As used in the claims, unless otherwise specified the use of the ordinal adjectives "first", "second", "third", etc., to describe a common object, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

Various embodiments of the invention may base the length of a transmission on the likelihood that an error will occur in the transmission. Since longer transmissions may be more likely to incur an error than shorter transmissions, the length of the transmission may be limited so that the likelihood of error is no greater than some predetermined threshold value. In this manner, actual failures in transmissions may be kept at a low level so that the need for retransmissions is also kept at a low level. The probability of error, and/or the selected threshold value, may be periodically re-determined, based on various criteria.

In general, the probability of a successful transmission may be described as $$(1-P_x)^n \qquad \text{(equation 1)}$$

where $P_x$ is the probability that an error will occur in a specified segment of communicated data, n is the number of those segments being communicated, and 'successful' means that those segments are all received without error. For example, if $P_x$ is the probability of an error occurring in a protocol data unit (PDU) and n is the number of PDUs in a transmission, then $(1-P_x)^n$ may be the probability that the transmission will be received without any errors occurring in those PDUs. (Note: although the text may sometimes refer to errors in a transmission, errors are generally detected by the receiving device after reception of the signal, regardless of the source of the errors.) In some communications, having a completely error-free transmission is not as important as making sure that certain portions of the transmission do not contain any errors. For example, in protocols that have multiple variable-length PDUs transmitted in a single burst, and in which each PDU contains a length field indicating where that PDU ends and the next PDU begins, failure to correctly decode the length field might cause that PDU and all the subsequent PDUs in the transmission to be unparsable and therefore lost. But an error in the payload portion of that PDU might be considered less important if it caused the loss of only that single PDU, since the end of that PDU could still be detected and therefore subsequent PDUs could be identified. An error in certain other fields, such as a CRC or other integrity check for the PDU, might also be considered fatal since that could raise questions about the integrity of the decoded length field. In such cases, equation 1 may still be used if $P_x$ represents the probability of an error in particular data segments, and n is the number of those particular data segments in the transmission. Non-critical fields (i.e., fields in which errors are not important for these purposes) may simply be ignored for this calculation. As used herein, the term 'data segment' merely refers to definable segments of the transmission. It does not attempt to make a distinction between data vs. instructions, data vs. overhead, data vs. non-data, etc.

The probability of an error in a specified data segment may not be readily known, but the bit error rate (BER) in a wireless communication may be easily available, for example from operations in the PHY layer. If $P_B$ is the probability of an error in a single bit based on the BER, and the specified data segment X in which errors are being considered contains L bits, then $$1-P_x=(1-P_B)^L \quad \text{(equation 2)}$$

Based on this, the probability of the successful transmission/ reception of n critical fields, in which each critical field contains L bits, may be $$(1-P_B)^{nL} \quad \text{(equation 3)}$$

If multiple different critical fields of different lengths are being considered, then various mathematical treatments may be used to derive an effective length. For example, if both an 11-bit length field and a 16-bit CRC field are considered critical in each PDU, then two lengths may be combined and the equation may assume a single critical field with a length of 27 bits in each PDU. Further, defining every field as a critical field may extend this equation to include the entire transmission.

To make use of the above properties, a threshold value T for this probability of success may be chosen, so that the probability of a successful transmission/reception ('successful' meaning no errors in the specified data segments), is equal to T. If $P_B$ and L are known, then the number of data segments n that may be transmitted, without exceeding the predetermined probability of error in those data segments, may be calculated as $$n<=\log(T)/(L*\log(1-P_B)). \quad \text{(equation 4)}$$

Thus, a transmission of n data segments, each data segment being L bits long, will have a probability T of successful reception of all those data segments. A transmission of less than n data segments may have an even higher probability of success. As previously stated, if only the errors in selected fields are relevant, then the calculation can be limited to those selected fields, and other fields in which errors are not considered important may be excluded from the calculations.

The threshold value T may be chosen based on various criteria. For example, when time-critical link information is corrupted before being received, the link connection may be dropped before the information can be retransmitted, and the two devices may have to go through a time-consuming re-association process before any further communications can take place between them. In such a case, a high threshold value (e.g., 0.99, or a 99% probability of success) may be chosen. Conversely, when communicating data that is not time-critical, a low threshold may be acceptable (e.g., 0.25). Acceptable thresholds may vary widely, depending on the importance of avoiding errors in the transmission.

FIG. 1 shows a flow diagram of a method, according to an embodiment of the invention. In flow diagram 100, at 110 a bit error rate (BER) for a communications path may be determined. In some embodiments, BER may be determined by directly measuring errors from one or more previous actual communications. In other embodiments, BER may be calculated based on theoretical considerations. Other embodiments may use still other techniques, including combinations of multiple techniques. In some embodiments, 'errors' may include correctable errors (i.e., errors that may be corrected by the receiving device based upon a CRC or other data integrity indicator included in the transmission). Other embodiments may exclude correctable errors from some or all of the error-related parameters.

A threshold value may be determined at 120 for the associated transmission. As previously described, this value may be based on various criteria, such as but not limited to the use to be made of the information by the receiving device. At 130, the length (e.g., in bits) of the critical data segments may be determined. For example, if an 11-bit Length field of a PDU is the critical data segment, then the length would be 11 bits. In some embodiments, if multiple fields with different lengths are considered critical, then a sum, average, or other mathematical treatment may be used to determine an effective length. For example, if an 11-bit length field and a 16-bit CRC are both considered critical for each PDU, then the critical length may be considered to be 27 bits.

Although the illustrated embodiment shows BER, success threshold, and length being determined in a particular order, in other embodiments these parameters may be determined in any feasible order. 'Determine', as used to describe these three parameters, may include obtaining these parameters through any feasible means, such as but not limited to any or all of: calculated, measured, read from a list or table, provided from some other source, etc. After determining these three parameters, at 140 a value n may be determined for the number of data segments to be transmitted in a single burst transmission. Some embodiments may use the previous described calculations for this, but other embodiments may use other means to determine the value of n.

At 150 one or more transmission buffers may be constructed, by placing the data to be transmitted into the correct order, with no more than n critical data segments included in the transmission buffers. At 160 the data may be read from the buffers and transmitted in a single transmission. In some embodiments the entire transmission may be placed into buffer(s) before beginning the transmission, but other embodiments may begin transmission while buffers are still being constructed. In some embodiments the entire transmission may be placed into the buffers, but in other embodiments some fields may be inserted into the data between the buffers and the transmission circuitry.

Figure 2:
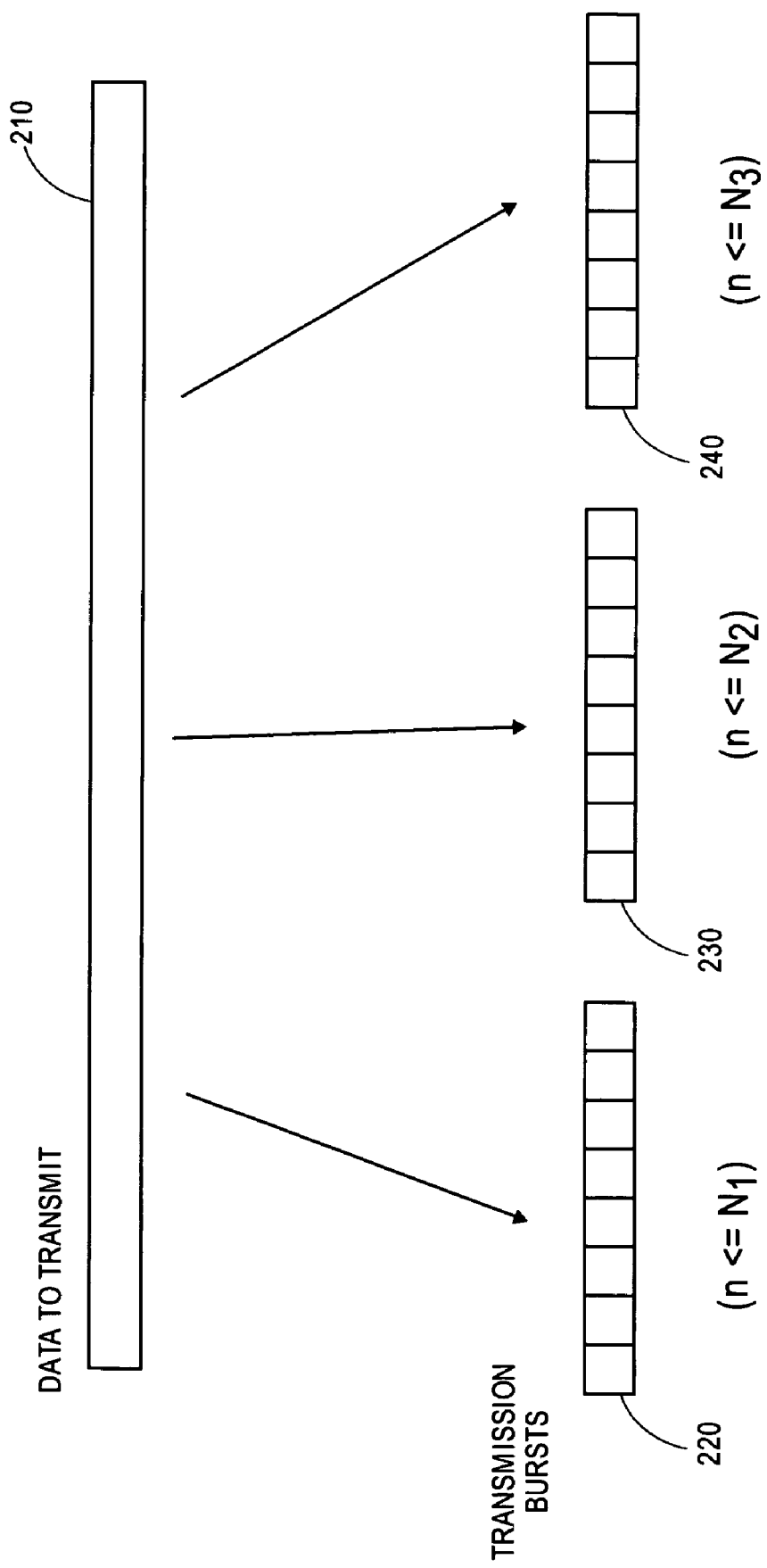
FIG. 2 shows a diagram of transmission buffers, according to an embodiment of the invention.

FIG. 2 shows a diagram of transmission buffers, according to an embodiment of the invention. In the illustrated example, a block of data 210 may be designated for transmission. Although it may be feasible to transmit the entire block in a single burst transmission, this block may have too much data to reliably transmit it in that manner. Using the previously described techniques, the large block may be broken down into multiple smaller blocks 220, 230, and 240. The number of critical data segments n may be limited to a value N1 in the first block, N2 in the second block, and N3 in the third block. If the aforementioned threshold value is the same for every block, then N1, N2, and N3 may all have the same value. If different types of data, with different associated threshold values, are included in data block 210, then the data in 210 may be assigned to blocks 220, 230, and 240 such that the data in block 220 has one threshold value, the data in block 230 has another threshold value, and the data in block 240 has a third threshold value. If different data types with different requirements are to be mixed in the same transmission block 220 (or 230 or 240), then the data type with the highest threshold value may set the threshold value for the entire block, or alternately an average or other statistical treatment may be used to derive a threshold value for the entire block.

Figure 3:
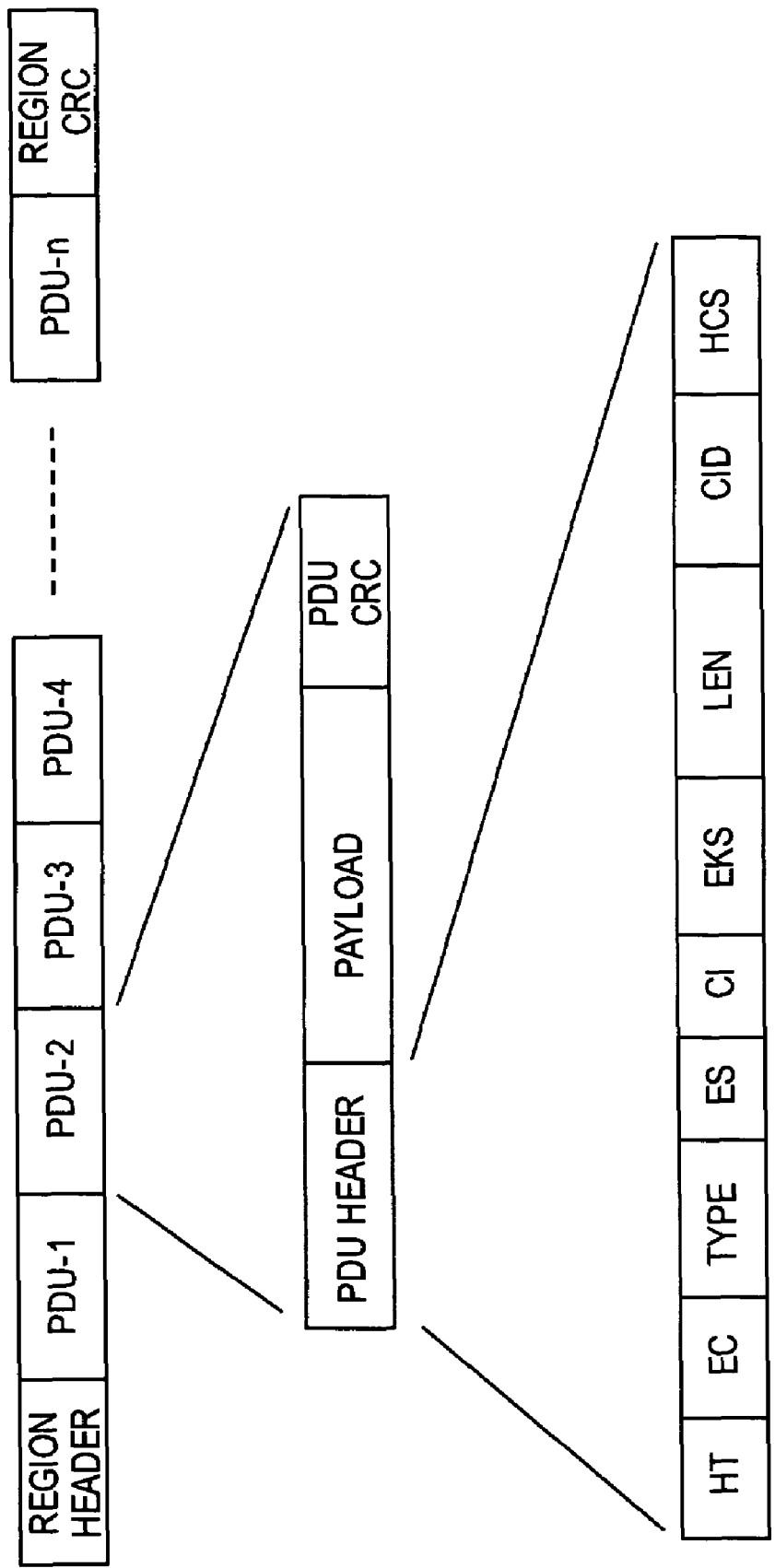
FIG. 3 shows a format for a transmission, according to an embodiment of the invention.

FIG. 3 shows a format for a transmission, according to an embodiment of the invention. At the top of FIG. 3 is shown an example of a format for a transmission containing multiple data segments (labeled as PDUs, although other embodiments may use other types of data segments). In some embodiments the transmission may be labeled as a frame, although other embodiments may not use that terminology. In the example, the multiple PDUs are shown as defining a transmission region, although other embodiments may not use that terminology. Accordingly, the example shows the PDUs preceded by a region header, which may contain information defining various aspects of the transmission. The example further shows a cyclic redundancy check (CRC) value for the region to be used for detecting (and in some embodiments correcting) errors in the received transmission. The example shows a quantity 'n' of PDUs being transmitted sequentially, where n may be any feasible quantity. In some embodiments the PDUs may be arranged in order of priority (either individually or in groups) with the highest priority PDUs at the beginning and the lowest priority PDUs at the end. In some embodiments the transmission may contain other fields not shown. In some embodiments the transmission may be part of a larger transmission which may contain other portions that may include, but are not limited to, other transmission regions.

Each PDU may have a defined format, one embodiment of which is shown as including a PDU header which may contain information defining various aspects of the PDU. The end of the PDU may include a value to check the data integrity of the received PDU, such as a PDU CRC. The payload field may contain the actual data that the PDU is intended to convey, while the PDU header and PDU CRC may be considered to be support fields that are included as a means to successfully convey the payload information from one device to another. However, in some embodiments the payload field may contain headers and/or payloads and/or CRC's for units of information smaller than a PDU or its equivalent, so that the header/payload/CRC combination may be nested at multiple levels. Further, in some embodiments the PDU may include other fields not shown.

Each PDU header may have a defined format, one embodiment of which is shown at the bottom of FIG. 3. Although other embodiments may have different formats and/or field definitions, the illustrated example contains the following fields:

HT—Header type. In some embodiments this may distinguish between a generic informational header, and a signaling header (which may not be followed by a data field).

EC—Encryption control. In some embodiments this may indicate if the subsequent data is encrypted.

Type—The type of payload in the data field. In some embodiments this may indicate the format used within the data field, including the presence of sub-headers.

ES—Extended subheader. In some embodiments, this may indicate additional header information.

CI—CRC indicator. In some embodiments this may indicate whether a CRC or other data integrity value is appended to the end of the data (e.g., in some embodiments there may not be a PDU CRC field).

EKS—Encryption key sequence. In some embodiments this may contain one or more keys associated with encryption/decryption of the data.

LEN—Length of the data segment. In some embodiments this field may indicate the length of the PDU in standards units (e.g., in bytes). The value contained in this field may be used by the receiving device to determine where in the received transmission that the current PDU ends and the subsequent PDU begins. In some embodiments, knowing this information may be critical to correctly receiving the remainder of the transmission.

CID—Connection identifier. In some embodiments this field may identify the connection between the transmitting and receiving parties for this PDU HCS—Header check sequence. In some embodiments this field may serve as a data integrity check (similar to a CRC) just for this header. In some embodiments a failure of the data integrity check of the header (e.g., based on the HCS) may invalidate the entire PDU and any subsequent PDUs in the transmission.

Figure 4:
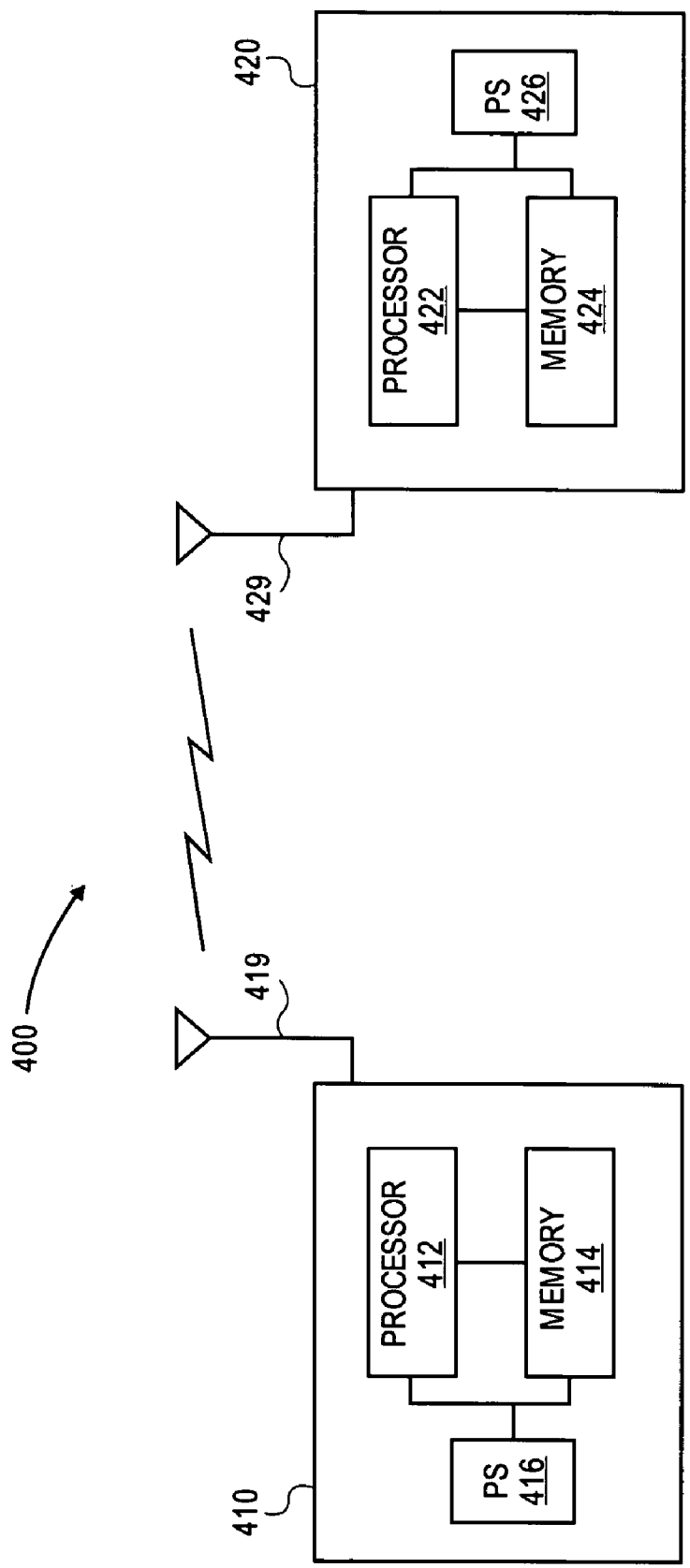
FIG. 4 shows a diagram of a communications system, according to an embodiment of the invention.

FIG. 4 shows a diagram of a communications system, according to an embodiment of the invention. In the illustrated embodiment, a wireless communications device 410 may transmit information to another wireless communications device 420, using the techniques described herein. Each device may have various components, such as but not limited to: at least one antenna (419, 429), at least one processor (412, 422), at least one memory (414, 424), and a power source (416, 426). In some embodiments the power source may comprise a battery, but in other embodiments the power source may use other techniques (e.g., a power supply to convert alternating current from a fixed source into direct current for powering the circuits of the device). In some embodiments the transmitting device may organize data segments for transmission in its memory, using the techniques described herein.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
   a wireless communications device to:
      determine a threshold value for a probability of an error occurring in particular data segments of a transmission;
      determine a length of the transmission such that the probability of the error occurring in the particular data segments within the determined length is no greater than the threshold value; and transmit the transmission with the determined length;

wherein the probability of error is based on bit error rate.

2. The apparatus of claim 1, wherein the transmission includes other data segments in which the probability of error is not considered.

3. The apparatus of claim 1, wherein the particular data segments are limited to header fields and data integrity check fields.

4. The apparatus of claim 1, wherein the probability of an error excludes the probability of a correctable error.

5. The apparatus of claim 1, wherein the threshold value is based on a use of contents of the transmission.

6. The apparatus of claim 1, wherein the wireless communications device further comprises a dipole antenna.

7. The apparatus of claim 1, wherein the wireless communications device further comprises a battery.

8. A method, comprising:
determining a threshold value for a probability of an error occurring in particular data segments of a transmission;
determining a length of the transmission such that the probability of the error occurring in the particular data segments within the determined length is not greater than the threshold value; and
transmitting the transmission with the determined length;
wherein the probability of error is based on bit error rate.

9. The method of claim 8, wherein said determining the threshold value and said determining the length are each based on all data segments in the transmission.

10. The method of claim 8, wherein said determining the threshold value and said determining the length are each based on less than all data segments in the transmission.

11. The method of claim 8, wherein the particular data segments are limited to header fields and data integrity check fields.

12. The method of claim 8, wherein the probability of an error includes the probability of a correctable error.

13. The method of claim 8, wherein the probability of an error excludes the probability of a correctable error.

14. The method of claim 8, wherein the threshold value is based on a use of contents of the transmission by a receiving device.

15. An article comprising
a tangible machine-readable medium that contains instructions, which when executed by one or more processors result in performing operations comprising:
determining a threshold value for a probability of an error occurring in particular data segments of a transmission;
determining a length of the transmission such that the probability of the error occurring in the particular data segments within the determined length is not greater than the threshold value; and
transmitting the transmission with the determined length;
wherein the probability-of error is based on bit error rate.

16. The article of claim 15, wherein the operations of determining the threshold value and determining the length are each based on all data segments in the transmission.

17. The article of claim 15, wherein the operations of determining the threshold value and determining the length are each based on less than all data segments in the transmission.

18. The article of claim 15, wherein the particular data segments include a length field.

19. The article of claim 15, wherein the probability of an error includes the probability of a correctable error.

20. The article of claim 15, wherein the probability of an error excludes the probability of a correctable error.

21. The article of claim 15, wherein the threshold value is based on a use of contents of the transmission by a receiving device.

* * * * *